United States Patent
Palberg et al.

(10) Patent No.: US 11,548,735 B2
(45) Date of Patent: Jan. 10, 2023

(54) SELF-PROPELLED MATERIAL PROCESSING AND/OR HANDLING SYSTEM

(71) Applicant: Liebherr-Components Biberach GmbH, Biberach an der Riss (DE)

(72) Inventors: Michael Palberg, Riedlingen (DE); Markus Merkle, Munderkingen (DE)

(73) Assignee: Liebherr-Components Biberach GmbH, Biberach an der Riss (DE)

( * ) Notice: Subject to any disclaimer, the term of this patent is extended or adjusted under 35 U.S.C. 154(b) by 521 days.

(21) Appl. No.: 16/573,913

(22) Filed: Sep. 17, 2019

(65) Prior Publication Data

US 2020/0010282 A1  Jan. 9, 2020

Related U.S. Application Data

(63) Continuation of application No. PCT/EP2018/056818, filed on Mar. 19, 2018.

(30) Foreign Application Priority Data

Mar. 22, 2017 (DE) ............ 10 2017 002 790.0

(51) Int. Cl.
*B65G 43/00* (2006.01)
*B65G 23/22* (2006.01)

(52) U.S. Cl.
CPC .......... *B65G 43/00* (2013.01); *B65G 23/22* (2013.01)

(58) Field of Classification Search
CPC ................. B65G 43/00; B65G 23/22
See application file for complete search history.

(56) References Cited

U.S. PATENT DOCUMENTS

| | | | |
|---|---|---|---|
| 2011/0248654 A1* | 10/2011 | Graner | E02F 9/2095 318/152 |
| 2017/0144530 A1* | 5/2017 | Jung | B60K 7/0007 |
| 2020/0010282 A1* | 1/2020 | Palberg | B65G 23/22 |

FOREIGN PATENT DOCUMENTS

| | | |
|---|---|---|
| CN | 201978805 U | 9/2011 |
| CN | 103206214 | 7/2013 |
| DE | 102010014644 | 10/2011 |
| EP | 0489969 | 6/1992 |
| WO | WO 2011/135846 | 11/2011 |
| WO | WO 2015/182944 | 12/2015 |
| WO | WO 2018/172244 | 9/2018 |

* cited by examiner

*Primary Examiner* — Kyle O Logan
(74) *Attorney, Agent, or Firm* — Levine Bagade Han LLP

(57) ABSTRACT

The present invention relates to a self-propelled material processing and/or handling system for processing and/or handling construction and/or raw materials, in particular in the form of a mobile crushing system, with at least one working unit, which is drivable, by an electric unit drive, with an electric motor, at least one electric travel drive with an electric motor, as well as a control device to control the electric motors of the unit and travel drives. According to the invention, the control device comprises a common frequency converter for the at least one travel drive and the at least one unit drive and provides various parameter sets for the common frequency converter so that the travel drive is actuatable by the frequency converter on the basis of a first parameter set and the unit drive is actuatable by the common frequency converter on the basis of a second parameter set.

17 Claims, 2 Drawing Sheets

NOT THE INVENTION

SELF-PROPELLED MATERIAL PROCESSING AND/OR HANDLING SYSTEM

CROSS-REFERENCE TO RELATED APPLICATIONS

This application is a continuation of International Application No. PCT/EP2018/056818, filed Mar. 19, 2018, which claims priority to German Application No. 10 2017 002 790.0, filed Mar. 22, 2017, both of which are incorporated by reference in their entireties.

BACKGROUND

The present invention relates to a self-propelled material processing and/or handling system for processing and/or handling construction and/or raw materials, in particular in the form of a mobile crushing system, with at least one working unit, which is drivable, by an electric unit drive, with an electric motor, at least one electric travel drive with an electric motor, as well as a control device to control the electric motors of the unit and travel drives.

In mobile crushing systems, it has been proposed in recent times to form the travel drives electrically, in order to be able to achieve high torques and a compact construction at low weight, wherein in particular the hydraulic lines of hydraulic drives, as well as also the hydraulic oil needed for this can be saved. In a similar way, electric drives for the function units of such crushing systems were also already proposed, in particular for the conveyor belts by means of which the mineral raw materials are supplied into the actual crushing device, wherein, if necessary, the drive of the crushing device itself can also be embodied electrically with one or multiple electric motors. Not only the hydraulic lines and the hydraulic oil which is needed for hydraulic drives are saved through such electric drives, but actuation of the drives is also simplified.

The control device for actuating the electric motors of the travel and unit drives here usually includes a power electronics, via which the electric motors are supplied with electrical energy, wherein frequency converters are usually provided as part of the power electronics, in order to be able to correspondingly control the electric drives.

Here, various requirements are placed for the actuation of the various drives, as the drives of the conveyor belts, for example, usually operate with constant working speeds in the working operation, if one refrains from start-up processes, while the travel drives must operate with variable speeds and different drive directions, for example in order to be able to go forward and back up or to be able to drive curves, which, in the usually available crawler chassis, is accomplished in that an outside crawler track is driven with greater speed than an inside crawler track.

At the same time, the various travel and unit drives differ considerably with respect to their power demands and the arising power fluctuations. While the crusher, for example, has a higher power demand and can show greater power fluctuations with, for example, high power peaks, if a larger piece of rock comes into engagement with the crushing tool, the conveyor belt drives can be operated with lower power and smaller fluctuations. The travel drives, in turn, are to be operated variably not only with respect to the drive speed and direction, but are also subject to different power requirements, for example if the system is moved uphill or downhill.

These different control requirements can be fulfilled in a simple way with frequency converters, as the respective drive can be actuated by the associated frequency converter with the required supply voltage and frequency.

However, in more complex processing or handling systems, a correspondingly larger space requirement and a complex wiring results, since the corresponding frequency converters for the various travel and unit drives are, in the switch cabinet of the system, to be accommodated and, in a corresponding way, to be wired. At the same time, relatively high costs result for the needed components and the assembly of the switch cabinet. In self-propelled crushing systems, diverse drives are namely usually present. Besides the two travel drives for the right and left chassis parts, multiple conveyor belts are usually to be driven in the functional working operation, i.e. crushing operation. In addition comes the drive for the crushing device itself, which can essentially be formed in various ways, wherein, for example, crushing rollers or shafts, or impact tools, such as hammer or mallet tools are to be driven.

In a similar way, with sieve and/or handling systems, such as belt systems, for handling mineral raw materials, there are also diverse working units, which are to be driven by respective unit drives in a corresponding way.

Against this background, the object of the invention is that of creating an improved processing and/or handling system of the aforementioned type, which avoids disadvantages of the prior art and develops the latter in an advantageous way. In particular, a space-saving, cost-effective actuation of the travel and unit drives is meant to be achieved, which takes into consideration the different power level and various operating characteristics of the drives.

SUMMARY

According to the invention, the mentioned object is solved by a processing and/or handling system according to claim 1. Preferred embodiments of the invention are the subject-matter of the dependent claims.

It is thus suggested, not to provide a distinct frequency converter for each electric drive, but rather to combine the actuation of the electric travel drive and at least one further unit drive in a common frequency converter, which is alterably formed with respect to its parameterization in order to be able to satisfy the actuation of both the travel drive and the further unit drive. According to the invention, the control device comprises a common frequency converter for the at least one travel drive and the at least one unit drive, and provides various parameter sets for the common frequency converter, so that the travel drive is actuatable by the frequency converter on the basis of a first parameter set, and the unit drive is actuatable by the common frequency converter on the basis of a second parameter set.

Through the use of a common frequency converter for multiple drives, corresponding space, which would be needed for multiple frequency converters, can be saved in the switch cabinet, wherein the costs can also be lowered in that, one the one hand, one frequency converter can be saved and, on the other hand, the wiring can be simplified. At the same time, through the use of various parameter sets and the adaptation of the parameterization of the common frequency converter, occurring in the system operation, to the respective drive to be actuated, the various operating characteristics, power levels and power fluctuations of the respective travel drive or unit drive to be driven can be taken into account. Here, particularly the combination of the travel drive with a unit drive is particularly advantageous, as the travel drive is not needed in generic processing or handling systems, like crushing systems, if the functioning units carrying out the generic processing or handling operation work, or vice versa, the mentioned working units, which bring about the generic processing and/or handling function, can be switched off if the drive unit is needed.

In a further development of the invention, in particular a circulating conveyor drive of the system can be combined with a travel drive of the system on the common frequency converter, wherein in particular a conveyor belt can be provided as a circulating conveyor, which belt can be driven by an electric-motor circulating conveyor drive. Such a conveyor belt can, for example, feed the construction or raw materials to be made smaller to the crushing device and/or put said materials onto a sieve and/or feed said materials to a handling unit, for example a further transport conveyor. Alternatively or additionally, the conveyor belt can also discharge the construction or raw material already made smaller and/or sieved. Alternatively to such a conveyor belt, a chain conveyor or a transport roller conveyor can also be provided as a circulating conveyor, the drive device of which is actuated by the same frequency converter by which the travel drive is actuated, as well. The control device here can process a second parameter set for the actuation of the circulating conveyor drive, in addition to a parameter set for the actuation of the travel drive, in order to be able to correspondingly adapt the parameterization of the common frequency converter.

Alternatively or additionally to such a circulating conveyor drive, a crusher drive and/or a sieve shaker drive can also, in terms of control, be combined in the common frequency converter with the travel drive. The control device then provides a crusher parameter set and/or a sieve shaker parameter set, in addition to a travel drive parameter set, in order be able to correspondingly adapt the parameterization of the frequency converter, depending on which of the drives is to be actuated.

The travel drive of the system can essentially be variously formed. The systems can, in an advantageous way, comprise a crawler chassis with right and left chassis parts, wherein separate electric travel drives with distinct electric motors can be provided for the right and the left chassis part, in order to be able to alter the travel speeds and/or drive directions on the right chassis side relative to the left chassis side.

If multiple travel drives are provided, for example in order to be able to vary and/or independently control a left crawler chassis track, with respect to drive speed and/or drive direction, relative to a right crawler chassis track, multiple frequency converters can be provided for the multiple travel drives, in a further development of the invention.

In a further development of the invention, at least one of the mentioned multiple frequency converters, for the multiple travel drives, can simultaneously be assigned one or multiple more unit drives, so that the at least one frequency converter can actuate the drive of one of the chassis parts on the one hand, and at least one unit drive on the other hand.

In a further development of the invention, it is advantageously also possible, however, that each of the multiple frequency converters, by means of which the travel drives of the various chassis parts can be driven or actuated, additionally can also be assigned at least one more other working unit drive, so that each of the named frequency converters possesses a dual or multi-control function and can actuate, on the one hand, at least one travel drive and, on the other hand, at least one working unit drive.

The various parameter sets for adapting the parameterization of the common frequency converter to the respective drive to be actuated can essentially be provided in various types and ways, so that the parameterization of the frequency converter is switchable in the system operation. In a further development of the invention, the control device can include a memory module, in which the mentioned multiple parameter sets can be stored. Alternatively or additionally, the control parameters of the common frequency converter can also respectively be adapted to the respective drive to be actuated in real time. For example, the control device can comprise a suitable sensor system and/or a determining device to that end, by means of which relevant characteristics of the respective drive to be actuated, for example power consumption, resistance or the like can be detected or determined, wherein an adaptor module of the control device then adapts the parameterization of the common frequency converter depending on the detected or determined drive characteristics of the respective drive to be actuated.

The mentioned multiple parameter sets can essentially include various operating parameters of the frequency converter. These can, for example, be motor data of the respective electric motor to be actuated, in particular the nominal voltage, nominal frequency, nominal speed or nominal power thereof. Alternatively or additionally, there can be system-specific parameters, for example a minimum speed and/or a maximum speed, a desired acceleration in the start-up phase and/or a desired lag time in the switch-off phase. Alternatively or additionally, there can be torque characteristic curves and/or a slippage compensation, with which the converter can compensate for the slippage at the electric motor via a higher frequency at the stator of the motor. The parameter set or the parameterization of the common frequency converter can, in addition, include further relevant parameters.

The altering of the parameterization of the frequency converter, depending upon the drive to be actuated by the frequency converter, can essentially be performed in various types and ways. For example, the hardware-sided configuration of the frequency converter can, by means of corresponding setting elements, be altered via a DIP switch, for example. Alternatively or additionally, alterations of the software-sided configuration can also be undertaken, in particular in the form of the alteration aforementioned parameter sets, on the basis of which the frequency converter operates.

In an advantageous further development of the invention, the control device is configured to alter the parameterization of the frequency converter in the system operation, so that the system does not have to be shut down or completely switched off before the frequency converter can actuate a different drive unit with an altered parameter set. Advantageously, the control device can here be configured in such a manner that, before switching of the parameter set, it is checked if the drive no longer to be actuated is stopped, before the parameterization for the new drive device to be actuated is provided at the frequency converter. If, for example, a starting signal for one of the conveyor belts of the crushing system is entered via the control device, the control device checks if the travel drive is stopped, wherein, if this is the case, then the control device supplies the frequency converter with the parameter set which is determined for the actuation of the drive of the mentioned conveyor belt.

BRIEF DESCRIPTION OF THE DRAWINGS

The invention is disclosed in further detail in the following based on a preferred exemplary embodiment and associated drawings. The drawings show in.

DETAILED DESCRIPTION

Figure 1:
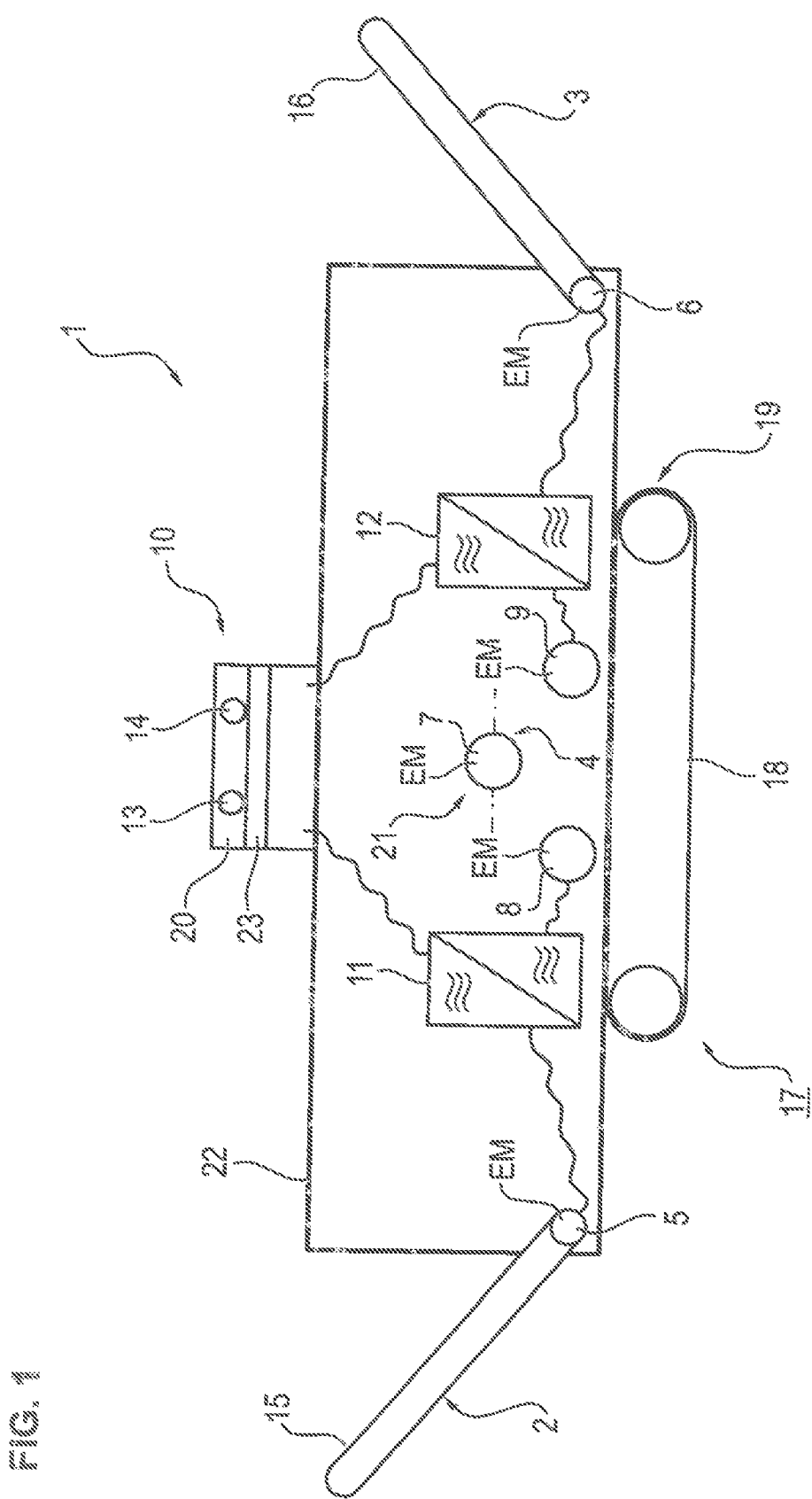
FIG. 1 a schematic illustration of a self-propelled crushing system according to an advantageous embodiment of the invention, according to which the frequency converters for the left and right chassis drives are respectively also used to actuate a conveyor belt, and FIG. 2 a schematic illustration of a crushing system according to the prior art, according to which each drive was assigned its own frequency converter.
Figure 2:
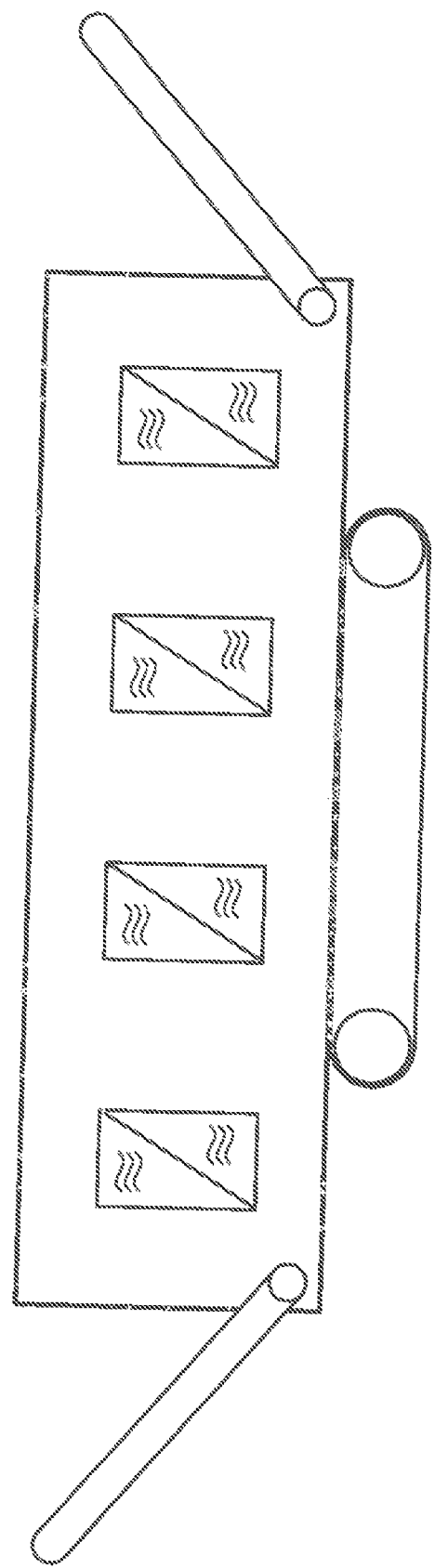

As FIG. 1 shows, a material processing and/or handling system 1 can be formed as a crushing system, which can serve to crush mineral construction or raw materials such as rock or the like. Such a crushing system 1 can comprise, as a main working unit 4, a crusher 21, for example including a crushing shaft and/or hammer tools, wherein the mentioned crusher 4 can be driven by a working unit drive 7, including an electric motor EM.

Further working units 2 and 3 can, for example, comprise circulating conveyors 15 and 16, for example in the form of conveyor belts, via which material to be processed can be supplied and removed. These further working units 2 and 3 can be driven via further unit drives 5 and 6, which likewise can comprise respectively at least one electric motor EM.

The mentioned main and secondary working units 5, 6 and 7 can be arranged on a machine body or frame 22, which can be supported by a chassis on the ground, wherein the mentioned chassis can in particular be configured as a crawler chassis 17, which comprises right and left chassis parts 18 and 19.

The mentioned right and left chassis parts 18 and 19 can respectively comprise a distinct travel drive 8 and 9 with an electric motor EM, respectively, so that the right and left chassis parts can be driven with travel speeds and/or drive directions alterable relative to one another.

In particular, the mentioned chassis parts 18 and 19 can respectively comprise a crawler track, which is drivable by the mentioned travel drives 8 and 9.

A control device 10 is provided to actuate the travel and unit drives 8, 9 or 5, 6 and 7, which device provides for frequency converters 11 and 12 for each of the two left and right travel drives 8 and 9, in order to variably control the mentioned travel drives 8 and 9 independently of each other or relatively to one another. The mentioned frequency converters 11 and 12 can simultaneously also be used to actuate the unit drives 5, 6 and 7 and form part of a power electronics, via which the mentioned travel and unit drives 8, 9 or 5, 6, 7 can be supplied with electrical energy.

In order to be able to use the common frequency converter 11 or 12 to actuate a travel drive 8 or 9 on the one hand, and to actuate a unit drive 5, 6, 7 on the other hand, the parameterization of the mentioned frequency converters 11 and 12 can be altered. To that end, the control device 10 can include a memory module 20, in which various parameter sets 13, 14 can be stored and are read or provided by the control device 10, depending on which drive is meant to be actuated.

The control device 10 can, to that end, comprise a switching device 23 which can provide a switching of the parameter sets 13 and 14 in the system operation, wherein the mentioned switching device 23 can include a manual activation means and/or alternatively or additionally also be configured automatically. For example, the switching can automatically be then provided when one of the conveyor belts 15 or 16 is started for example, wherein the control device 10 here initially examines if the travel drives 8 and 9 are stopped, in order to then switch the parameter set for the respective circulating conveyor to active. Conversely, if one of the travel drives 8 and 9 is required in that a travel request is entered, the control device 10 examines if the working units 2, 3, 4 are stopped and then switches the parameter set for the actuation of the travel drives to available.

We claim:

1. A self-propelled material processing and/or handling crushing system for processing and/or handling construction and/or raw materials comprising:
    a working unit drivable by an electric working unit drive comprising an electric motor,
    an electric travel drive comprising an electric motor,
    a control device for controlling the electric motor of the electric working unit drive and the electric motor of the electric travel drive, wherein the control device comprises a common frequency converter configured to separately actuate the electric travel drive and the electric working unit drive, wherein the control device is configured to read or provide multiple parameter sets for the common frequency converter, wherein the electric travel drive is separately actuatable from the electric working unit drive by the common frequency converter on the basis of a first parameter set of the multiple parameter sets, and wherein the electric working unit drive is separately actuatable from the electric travel drive by the common frequency converter on the basis of a second parameter set of the multiple parameter sets.

2. The self-propelled material processing and/or handling crushing system of claim 1, wherein the working unit comprises a circulating conveyor comprising a conveyor belt.

3. The self-propelled material processing and/or handling crushing system of claim 1, wherein the working unit comprises a crushing device or a sieve system.

4. The self-propelled material processing and/or handling crushing system of claim 1, further comprising a crawler chassis drivable by the electric travel drive.

5. The self-propelled material processing and/or handling crushing system of claim 4, wherein the electric travel drive is a first electric travel drive, wherein the system further comprises a second electric travel drive comprising an electric motor, wherein the crawler chassis comprises a first chassis part and a second chassis part, wherein the first chassis part comprises the first electric travel drive, wherein the second chassis part comprises the second electric travel drive, wherein the first electric travel drive is actuatable by the common frequency converter, and wherein the second electric travel drive is actuatable by a frequency converter.

6. The self-propelled material processing and/or handling crushing system of claim 5, wherein the first electric travel drive and the second electric travel drive are each configured to actuate a further electric working unit drive.

7. The self-propelled material processing and/or handling crushing system of claim 4, wherein the crawler chassis is movable over ground.

8. The self-propelled material processing and/or handling crushing system of claim 1, wherein the multiple parameter sets are stored in a memory module and are selectively accessible depending on whether the electric travel drive or the electric working unit drive is to be actuated.

9. The self-propelled material processing and/or handling crushing system of claim 1, wherein the control device comprises a determining device configured to determine an operating characteristic of the electric travel drive and the electric working unit drive, and wherein the control device comprises an adaptor module for adapting the parameterization of the common frequency converter depending on a determined operating characteristic to actuate the electric travel drive or the electric working unit drive.

10. The self-propelled material processing and/or handling crushing system of claim 1, wherein the control device comprises a switching device for switching between the multiple parameter sets.

11. The self-propelled material processing and/or handling crushing system of claim 10, wherein the switching device is configured for automatically switching between the multiple parameter sets depending on a status of the electric travel drive or a status of the electric working unit drive, and wherein the switching device is configured to switch the first parameter set to the second parameter set only after a stopping of the electric travel drive.

12. The self-propelled material processing and/or handling crushing system of claim 11, wherein the switching device is configured to switch the second parameter set to the first parameter set only after a stopping of the electric working unit drive.

13. The self-propelled material processing and/or handling crushing system of claim 10, wherein the switching device is configured for automatically switching between the multiple parameter sets depending on a status of the electric travel drive or a status of the electric working unit drive, and wherein the switching device is configured to switch the second parameter set to the first parameter set only after a stopping of the electric working unit drive.

14. The self-propelled material processing and/or handling crushing system of claim 1, wherein the electric travel drive is actuatable by the common frequency converter on the basis of the first parameter set while the electric working unit drive is stopped, and wherein the electric working unit drive is actuatable on the basis of the second parameter set while the electric travel drive is stopped.

15. The self-propelled material processing and/or handling crushing system of claim 1, wherein the electric travel drive is actuatable by the common frequency converter on the basis of the first parameter set after the electric working unit drive is stopped, and wherein the electric working unit drive is actuatable on the basis of the second parameter set after the electric travel drive is stopped.

16. The self-propelled material processing and/or handling crushing system of claim 1, wherein the working unit is propellable over ground by the electric travel drive.

17. The self-propelled material processing and/or handling crushing system of claim 1, further comprising a track drivable by the electric travel drive, wherein the track is configured to contact ground.

* * * * *